United States Patent
Chiang et al.

(10) Patent No.: US 6,192,081 B1
(45) Date of Patent: Feb. 20, 2001

(54) APPARATUS AND METHOD FOR SELECTING A CODING MODE IN A BLOCK-BASED CODING SYSTEM

(75) Inventors: Tihao Chiang, Plainsboro, NJ (US); Max Chien; Wilson Kwok, both of San Jose, CA (US); Huifang Sun, Cranbury, NJ (US)

(73) Assignee: Sarnoff Corporation, Princeton, NJ (US)

( * ) Notice: Under 35 U.S.C. 154(b), the term of this patent shall be extended for 0 days.

(21) Appl. No.: 09/549,244

(22) Filed: Oct. 26, 1995

Related U.S. Application Data

(63) Continuation of application No. 08/547,741, filed on Jan. 17, 1996, now abandoned.

(51) Int. Cl.$^7$ ............................... H04N 7/36; H04N 7/50
(52) U.S. Cl. ............................... 375/240.16; 375/240.05
(58) Field of Search ............................... 348/405, 405.1, 348/416, 416.1, 402, 402.1; 375/240.16, 240.05, 240.07; H04N 7/36, 7/50

(56) References Cited

U.S. PATENT DOCUMENTS

| | | | |
|---|---|---|---|
| 4,218,704 | 8/1980 | Netravall et al. | 348/416.1 |
| 4,958,226 | 9/1990 | Haskell et al. | 375/240.12 |
| 4,972,260 | * 11/1990 | Fujikawa | 348/405 |
| 5,091,782 | * 2/1992 | Krause | 348/402 |
| 5,134,476 | 7/1992 | Aravind et al. | 348/415.1 |
| 5,231,484 | 7/1993 | Gonzales et al. | 375/240.04 |
| 5,253,059 | 10/1993 | Ansari et al. | 348/390.1 |
| 5,365,271 | * 11/1994 | Asano | 348/402 |
| 5,440,345 | 8/1995 | Shimoda | 375/240.14 |
| 5,491,513 | 2/1996 | Wickstrom et al. | 375/240.15 |
| 5,576,767 | 11/1996 | Lee et al. | 375/240.14 |
| 5,594,504 | 1/1997 | Ebrahimi | 375/240.16 |

OTHER PUBLICATIONS

T. Weigand et al., "Efficient Mode Selection for Block–Based Motion Compensated Video Coding", distributed at International Conference on Image Processing held at Washington D.C.(Oct. 22–24, 1995).

* cited by examiner

Primary Examiner—Howard Britton
(74) Attorney, Agent, or Firm—William J. Burke

(57) ABSTRACT

An apparatus and concomitant method for selecting a macroblock coding mode based upon the quantization scale selected for the macroblock. The total number of bits needed to code each macroblock consists of two parts, bits needed for coding motion vectors and bits for coding the predictive residual. The number of bits for coding the motion vectors is generally obtained from a look-up table. The number of bits for coding the predictive residual is obtained by an estimation which assumes that the number of bits for encoding the predictive residuals is directly proportional to the value of its variance and inversely proportional to the value of quantizer steps (quantizer scale). Using this estimation, the total number of bits necessary to code a macroblock is calculated and compared for each coding mode. By selecting the coding mode with the least number of bits, a near-optimal solution of low complexity for practical implementation is acquired.

13 Claims, 2 Drawing Sheets

APPARATUS AND METHOD FOR SELECTING A CODING MODE IN A BLOCK-BASED CODING SYSTEM

CROSS REFERENCE TO RELATED APPLICATION

This application is a continuation of patent application Ser. No. 08/547,741 filed Jan. 17, 1996, now abandoned entitled "APPARATUS AND METHOD FOR SELECTING A CODING MODE IN A BLOCK-BASED CODING SYSTEM".

The present invention relates to an apparatus and concomitant method for optimizing the coding of motion video. More particularly, this invention relates to an apparatus and method that selects a macroblock coding mode based upon the quantization scale selected for the macroblock.

BACKGROUND OF THE INVENTION

The increasing development of digital video technology presents an ever increasing problem of reducing the high cost of video compression codecs and resolving the interoperability of equipment of different manufacturers. To achieve these goals, the Moving Picture Experts Group (MPEG) created the ISO/IEC international Standards 13818-1 (1994) (generally referred to as MPEG-1) and 13818-2 (Jan. 20, 1995 draft) (generally referred to as MPEG-2), which are incorporated herein in their entirety by reference. One goal of these standards is to establish a standard coding/decoding strategy with sufficient flexibility to accommodate a plurality of different applications and services such as desktop video publishing, video conferencing, digital storage media and television broadcast.

Although the MPEG standards specify a general coding methodology and syntax for generating a MPEG compliant bitstream, many variations are permitted in the values assigned to many of the parameters, thereby supporting a broad range of applications and interoperability. In effect, MPEG does not define a specific algorithm needed to produce a valid bitstream. Furthermore, MPEG encoder designers are accorded great flexibility in developing and implementing their own MPEG-specific algorithms in areas such as image pre-processing, motion estimation, coding mode decisions, scalability, and rate control. This flexibility fosters development and implementation of different MPEG-specific algorithms, thereby resulting in product differentiation in the marketplace. However, a common goal of MPEG encoder designers is to minimize subjective distortion for a prescribed bit rate and operating delay constraint.

In the area of coding mode decision, MPEG provides a plurality of different macroblock coding modes. Generally, these coding modes are grouped into two broad classifications, inter mode coding and intra mode coding. Intra mode coding involves the coding of a macroblock or picture that uses information only from that macroblock or picture. Conversely, inter mode coding involves the coding of a macroblock or picture that uses information both from itself and from macroblocks and pictures occurring at different times. Specifically, MPEG-2 provides macroblock coding modes which include intra mode, no motion compensation mode (No MC), frame/field/dual-prime motion compensation inter mode, forward/backward/average inter mode and field/frame DCT mode. For a detailed description of each coding mode, see the ISO/IEC international Standards for MPEG-1 and MPEG-2.

These coding modes provide different coding strategies (predictions) which produce different efficiencies in the number of bits necessary to code a macroblock. Thus, each mode is more efficient than another depending upon a number of different factors such as the coarseness of the quantization scale, picture type, and nature of the signal within the macroblock. To achieve optimal coding performance, it is necessary to select the most efficient coding mode by calculating and comparing the number of bits necessary to code a particular macroblock for each separate mode. The most efficient coding mode should code the macroblock with the least amount of bits. However, the determination of the optimal solution is further complicated by the MPEG differential encoding of motion vectors and discrete cosine transform (DCT) coefficients, which introduces dependencies that carry over from macroblock to macroblock for a duration equal to the slice length. A slice is a sequence of macroblocks which are located in the same horizontal row in raster scan order. Due to such dependencies, a "full-search" calculation must now compare the efficiencies of various combinations of different modes in coding a slice where each individual macroblock can be coded in a different mode.

To illustrate, if a slice has a length of ten (10) macroblocks and there are five (5) different coding modes, then there are $5^{10}$ available coding combinations for each slice. The computation for a full-search is exponentially proportional to the slice size based on the number of modes. Thus, the dependency results in an exponentially growing function, thereby increasing the complexity of the above calculation by many folds. In fact, the time delay associated with the above calculation is unacceptable for many MPEG applications. Thus, due to the long time delay and severe computational overhead, it is impractical to select a coding mode based upon the result of a full-search calculation.

In the current MPEG coding strategies (e.g., Test Models 4 and 5 (TM4 and TM5)), the coding mode for each macroblock is selected by comparing the energy of the predictive residuals (error signal). Namely, the intra mode/inter mode decision is determined by a comparison of the variance ($\sigma^2$) of the macroblock pixels against the variance of the predictive residuals for each coding mode. However, the coding mode selected by this criterion may not achieve optimal coding performance, since a high variance may not necessarily translate to an increase in the number of bits necessary to code a macroblock. Thus, a coding strategy based solely on such variance may not necessarily reduce the final compression bit count.

Therefore, a need exists in the art for an apparatus and method for selecting a coding mode which approaches the optimal solution and is relatively simple to facilitate practical implementation.

SUMMARY OF THE INVENTION

The present invention is an apparatus and method for selecting a macroblock coding mode based upon the quantization scale selected for the macroblock. The efficiency of a particular coding mode is affected by the operating point for distortion (i.e., for a particular quantization scale). For example, a coding mode that produces low distortion in encoding a macroblock may in fact perform poorly where high distortion in encoding a macroblock is acceptable. Thus, the current invention selects an appropriate coding mode in accordance with the quantization scale selected for the macroblock.

Specifically, the total number of bits needed to code each macroblock consists of two parts, bits needed for coding motion vectors and bits for coding the predictive residual.

The number of bits for coding the motion vectors is generally obtained from a look-up table. The number of bits for coding the predictive residual is obtained by an estimation which assumes that the number of bits for encoding the predictive residuals is directly proportional to the value of its variance and inversely proportional to the value of quantizer steps (quantization scale). Using this estimation, the total number of bits necessary to code a macroblock is calculated and compared for each coding mode. By selecting the coding mode with the least number of bits, the invention attains a near-optimal solution of low complexity for practical implementation.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
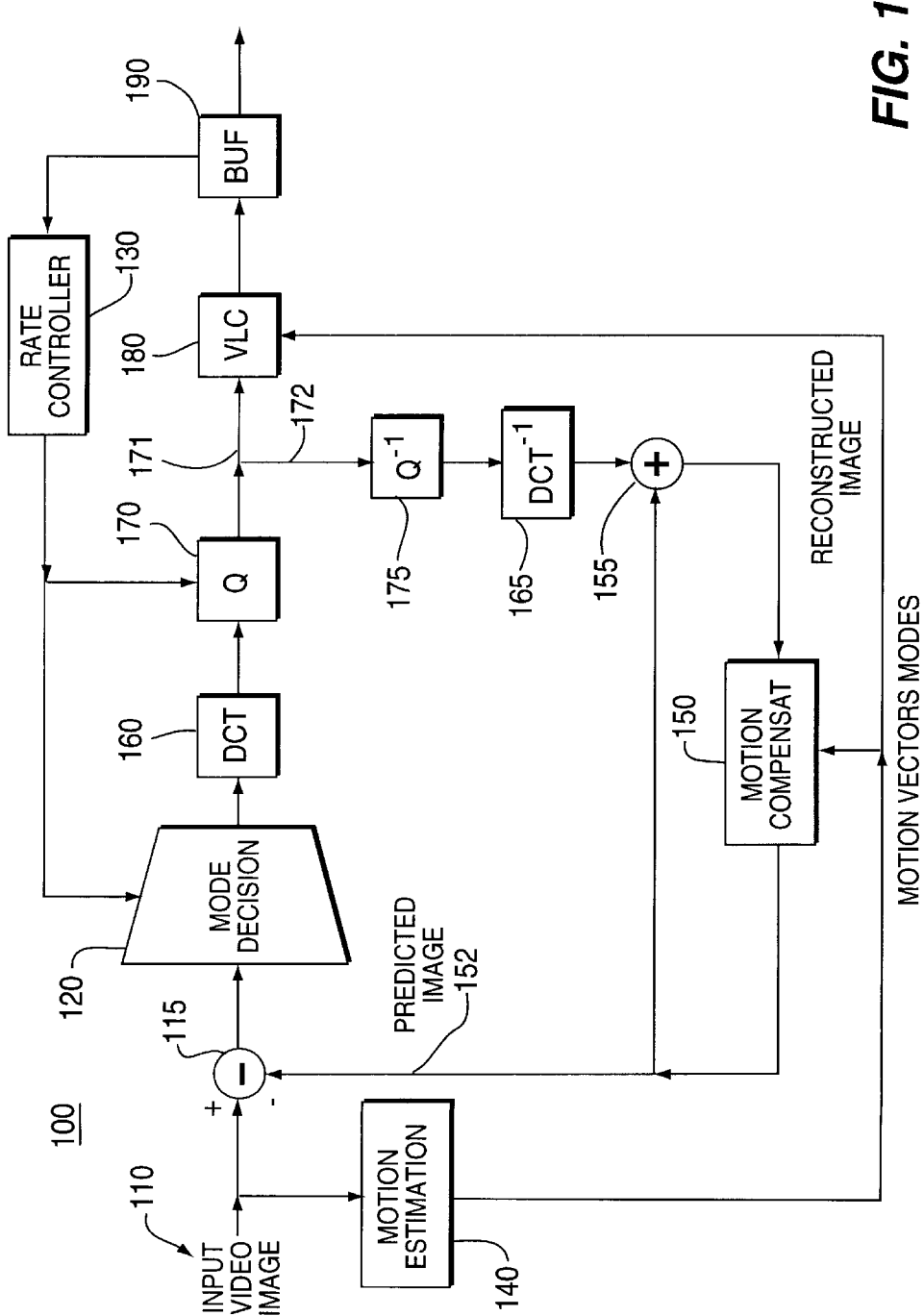
FIG. 1 illustrates a block diagram of the system of the present invention for determining jointly the mode selection with the rate control.

FIG. 1 depicts a block diagram of the apparatus 100 of the present invention for determining a coding mode for a macroblock in conjunction with the rate control. In the preferred embodiment of the present invention, the apparatus 100 is an encoder or a portion of a more complex block-based motion compensation coding system. The apparatus 100 comprises a motion estimation module 140, a motion compensation module 150, a mode decision module 120, a rate control module 130, a DCT module 160, a quantization module 170, a variable length coding module 180, a buffer 190, an inverse quantization module 175, an inverse DCT module 165, a subtractor 115 and a summer 155. Although the encoder 100 comprises a plurality of modules, those skilled in the art will realize that the functions performed by the various modules are not required to be isolated into separate modules as shown in FIG. 1. For example, the set of modules comprising the motion compensation module 150, inverse quantization module 175 and inverse DCT module 165 is generally known as an "embedded decoder".

FIG. 1 illustrates an input video image (image sequence) 110 which is digitized and represented as a luminance and two color difference signals ($Y$, $C_r$, $C_b$) in accordance with the MPEG standards. These signals are further divided into a plurality of layers such that each picture (frame) is represented by a plurality of macroblocks. Each macroblock comprises four (4) luminance blocks, one $C_r$ block and one $C_b$ block where a block is defined as an eight (8) by eight (8) sample array. The division of a picture into block units improves the ability to discern changes between two successive pictures and improves image compression through the elimination of low amplitude transformed coefficients (discussed below). The digitized signal may optionally undergo preprocessing such as format conversion for selecting an appropriate window, resolution and input format.

The input video image 110 is received into motion estimation module 140 for estimating motion vectors. A motion vector is a two-dimensional vector which is used by motion compensation to provide an offset from the coordinate position of a block in the current picture to the coordinates in a reference frame. Because of the high redundancy that exists between the consecutive frames of a video sequence, a current frame can be reconstructed from a previous reference frame and the difference between the current and previous frames by using the motion information (motion vectors). The use of motion vectors greatly enhances image compression by reducing the amount of information that is transmitted on a channel because only the changes within the current frame are coded and transmitted. Various methods are currently available to an encoder designer for implementing motion estimation.

The motion vectors from the motion estimation module 140 are received by the motion compensation module 150 for improving the efficiency of the prediction of sample values. Motion compensation involves a prediction that uses motion vectors to provide offsets into the past and/or future reference frames containing previously decoded sample values that are used to form the prediction error. Namely, the motion compensation module 150 uses the previously decoded frame and the motion vectors to construct an estimate of the current frame.

Furthermore, prior to performing motion compensation prediction for a given macroblock, a coding mode must be selected. As discussed above, a plurality of coding modes is available and the proper selection of a coding mode for each macroblock will produce optimal coding performance. In the preferred embodiment of the present invention, a prediction for each coding mode is performed by the motion compensation module 150. Thus, depending on the coding mode, the motion compensation module forms a motion compensated prediction (predicted image) 152 of the contents of the block based on past and/or future reference pictures. This motion compensated prediction 152 is subtracted via subtractor 115 from the input video image 110 in the current macroblocks to form an error signal (e) or predictive residual. The predictive residuals of all the coding modes for each macroblock are forwarded to the mode decision module 120 for evaluation.

The mode decision module 120 uses the predictive residuals for determining jointly the selection of a coding mode for each macroblock with the rate control. Unlike TM 4 and TM 5 which simply selects a coding mode for a macroblock which produces the smallest variance, the mode decision module 120 applies a method which accounts for the effect of a particular quantization scale on the efficiency of a particular coding mode. The mode decision module 120 estimates the total number of bits that is needed to code each macroblock for each coding mode. The estimation obtains the number of bits for coding the predictive residual with the assumption that the number of bits for encoding the predictive residual is directly proportional to the value of its variance and inversely proportional to the value of quantizer steps (quantization scale). Under this simplified approach, a near-optimal solution is obtained with only a fraction of the complexity of a full-search. A detailed description of this estimation is discussed below with reference to FIG. 2.

Having selected a coding mode for a macroblock, the mode decision module 120 passes the corresponding predictive residual signal from the selected coding mode to the DCT module 160. The DCT module then applies a forward discrete cosine transform process to each block of the predictive residual signal to produce a set of eight (8) by eight (8) block of DCT coefficients. The discrete cosine transform is an invertible, discrete orthogonal transformation where the DCT coefficients represent the amplitudes of a set of cosine basis functions. One advantage of the discrete cosine transform is that the DCT coefficients are uncorrelated. This decorrelation of the DCT coefficients is important for compression, because each coefficient can be treated independently without the loss of compression efficiency. Furthermore, the DCT basis function or subband decomposition permits effective use of psychovisual criteria which is important for the next step of quantization.

The resulting 8×8 block of DCT coefficients is received by quantization module 170 where the DCT coefficients are quantized. The process of quantization reduces the accuracy with which the DCT coefficients are represented by dividing the DCT coefficients by a set of quantization values with appropriate rounding to form integer values. The quantization values can be set individually for each DCT coefficient, using criteria based on the visibility of the basis functions (known as visually weighted quantization). Namely, the quantization value corresponds to the threshold for visibility of a given basis function, i.e. the coefficient amplitude that is just detectable by the human eye. By quantizing the DCT coefficients with this value, many of the DCT coefficients are converted to zeros, thereby improving image compression efficiency. The process of quantization is a key operation and is an important tool to achieve visual quality and to control the encoder to match its output to a given bit rate (rate control). Since a different quantization value can be applied to each DCT coefficient, a "quantization matrix" is generally established as a reference table, e.g., a luminance quantization table or a chrominance quantization table. Thus, the encoder chooses a quantization matrix that determines how each frequency coefficient in the transformed block is quantized.

However, subjective perception of quantization error greatly varies with the frequency and it is advantageous to use coarser quantization values for the higher frequencies. Namely, human perceptual sensitivity of quantization errors are lower for the higher spatial frequencies. As a result, high frequencies are quantized more coarsely with fewer allowed values than low frequencies. Furthermore, an exact quantization matrix depends on many external parameters such as the characteristics of the intended display, the viewing distance and the amount of noise in the source. Thus, it is possible to tailor a particular quantization matrix for an application or even for an individual sequence of frames. Generally, a customized quantization matrix can be stored as context together with the compressed video. Again, many methods are currently available to an encoder designer for implementing the quantization process.

Next, the resulting 8×8 block of quantized DCT coefficients is received by variable length coding module 180 via signal connection 171, where the two-dimensional block of quantized coefficients is scanned in a "zig-zag" order to convert it into a one-dimensional string of quantized DCT coefficients. This zig-zag scanning order is an approximate sequential ordering of the DCT coefficients from the lowest spatial frequency to the highest. Since quantization generally reduces DCT coefficients of high spatial frequencies to zero, the one-dimensional string of quantized DCT coefficients is typically represented by several integers followed by a string of zeros.

Variable length coding (VLC) module 180 then encodes the string of quantized DCT coefficients and all side-information for the macroblock such as macroblock type and motion vectors. The VLC module 180 utilizes variable length coding and run-length coding to efficiently improve coding efficiency. Variable length coding is a reversible coding process where shorter code-words are assigned to frequent events and longer code-words are assigned to less frequent events, while run-length coding increases coding efficiency by encoding a run of symbols with a single symbol. These coding schemes are well known in the art and are often referred to as Huffman coding when integer-length code words are used. Thus, the VLC module 180 performs the final step of converting the input image into a valid data stream.

The data stream is received into a "First In-First Out" (FIFO) buffer 190. A consequence of using different picture types and variable length coding is that the overall bit rate is variable. Namely, the number of bits used to code each frame can be different. Thus, in applications that involve a fixed-rate channel, a FIFO buffer is used to match the encoder output to the channel for smoothing the bit rate. Thus, the output signal of FIFO buffer 190 is a compressed representation of the input video image 110, where it is sent to a storage medium or telecommunication channel.

The rate control module 130 serves to monitor and adjust the bit rate of the data stream entering the FIFO buffer 190 to prevent overflow and underflow on the decoder side (within a receiver or target storage device, not shown) after transmission of the data stream. A fixed-rate channel is assumed to carry bits at a constant rate to an input buffer within the decoder (not shown). At regular intervals determined by the picture rate, the decoder instantaneously removes all the bits for the next picture from its input buffer. If there are too few bits in the input buffer, i.e., all the bits for the next picture have not been received, then the input buffer underflows resulting in an error. Similarly, if there are too many bits in the input buffer, i.e., the capacity of the input buffer is exceeded between picture starts, then the input buffer overflows resulting in an overflow error. Thus, it is the task of the rate control module 130 to monitor the status of buffer 190 to control the number of bits generated by the encoder, thereby preventing the overflow and underflow conditions. Rate control algorithms play an important role in affecting image quality and compression efficiency.

Currently, one way of controlling the bit rate is to alter the quantization process, which will affect the distortion of the input image. By altering the quantizer scale (step size), the bit rate can be changed and controlled. To illustrate, if the buffer is heading toward overflow, the quantization scale should be increased. This action causes the quantization process to reduce additional DCT coefficients to zero, thereby reducing the number of bits necessary to code a macroblock. This, in effect, reduces the bit rate and should resolve a potential overflow condition.

Conversely, if the buffer is heading toward underflow, the quantization scale should be decreased. This action increases the number of non-zero quantized DCT coefficients, thereby increasing the number of bits necessary to code a macroblock. Thus, the increased bit rate should resolve a potential underflow condition.

In the preferred embodiment of the present invention, the quantization scale is used to determine the proper selection of a coding mode as illustrated in FIG. 1. Thus, as the rate control module 130 alters the quantization scale to correct an overflow or underflow condition, the mode decision module 120 responds by selecting the most optimal coding mode under the current quantization scale for each macroblock. The method in which the selection of a coding mode is affected by the quantization scale is discussed with reference to FIG. 2 below.

Furthermore, the resulting 8×8 block of quantized DCT coefficients from the quantization module 170 is received by the inverse quantization module 175 via signal connection 172. At this stage, the encoder regenerates I-frames and P-frames of the input video image by decoding the data so that they are used as reference frames for subsequent encoding. The inverse quantization module 175 starts the decoding process by dequantizing the quantized DCT coefficients. Namely, the quantized DCT coefficients are multiplied by a set of quantization values with appropriate rounding to produce integer values.

The resulting dequantized 8×8 block of DCT coefficients are passed to the inverse DCT module 165 where inverse DCT is applied to each macroblock to produce the decoded error signal. This error signal is added back to the prediction signal from the motion compensation module via summer 155 to produce a decoded reference picture. Generally, if an I-frame or a P-frame is decoded, it will be stored, replacing the oldest stored reference. Thus, an apparatus 100 that selects a macroblock coding mode based upon the quantization scale selected for the macroblock is disclosed.

To develop the preferred embodiment of the present invention, a constrained optimization problem was formulated for the selection of the coding mode. The solution is based upon the rate-distortion characteristics or R(D) curves for all the macroblocks that compose the picture being coded. Based upon the optimized results, a method for selecting the coding mode for each macroblock is presented.

An "upper bound" in coding performance based on the optimization of coding mode selection in accordance with the quantization scale is initially obtained. The upper bound represents a near-optimal solution for a set of constraints. Once an upper bound is calculated, it is used to assess the performance of practical sub-optimum methods.

The first constraint for the near-optimal solution is:

$$D_{PICT} = \sum_{i=1}^{NMB} D_{MBi} \quad (1)$$

which states that the distortion for the picture, $D_{PICT}$, is measured as an accumulation of individual macroblock distortions, $D_{MB}$, for all NMB, the number of macroblocks in the picture. This objective function is minimized by having the individual macroblock distortions, $D_i$, being uniform over the picture:

$$D_1 = D_2 = \ldots = D_{NMB} \quad (2)$$

and having the bits generated from coding each macroblock, $R_{MBi}$, sum to a target bit allocation for the entire picture (picture bit budget), $R_{PICT}$:

$$\sum_{i=1}^{NMB} R_{MBi} = R_{PICT} \quad (3)$$

The choice for the macroblock distortion measure, $D_{MB}$ can be mean-square-sum (MSE) computed over the pixels in the macroblock, quantizer scale used in coding the macroblock, or it can be a measure that reflects subjective distortion more accurately, such as luminance and frequency weighted MSE or spatial-activity weighted quantizer scale. The solution to this optimization problem is unique due to the fact that the objective function and the individual macroblock R(D) functions are monotonic.

As discussed above, there is an enormous computational overhead in the calculation of the optimal solution (full search) due to the MPEG differential encoding of motion vectors and DCT coefficients, which introduces dependencies that propagate from macroblock to macroblock for a duration specified by the slice length. To avoid the full-search process, the calculation for the upper bound adopts a "greedy algorithm" for addressing the dependency problem. The greedy algorithm reduces the computational overhead by selecting a coding mode based upon the best coding mode selected for the previous coded macroblock. In effect, the greedy algorithm process limits the dependency only to the previous coded macroblock, instead of accounting the dependencies for the full length of a slice as in a full-search process. Thus, the upper bound is a near-optimum solution instead of a global optimum solution.

In order to obtain the optimal coding mode, a calculation and comparison of the total number of bits needed to code each macroblock for each coding mode with the same quantizer scale is conducted. The total number of bits for each macroblock, $B_t$, consists of two parts, bits needed for coding motion vectors, $B_{mv}$, and bits needed for coding the predictive residual, $B_{res}$. It should be noted that $B_{res}$ includes bits for coding side information such as macroblock type, quantizer scale, coded-block-pattern, and bits for DCT coefficients. However, the bits needed for coding DCT coefficients generally comprise a majority of $B_{res}$ and are considered to be the dominant part of $B_{res}$. Thus, the total number of bits needed to code each macroblock is represented by:

$$B_t = B_{mv} + B_{res} \quad (4)$$

The number of bits needed to code motion vectors, $B_{mv}$, is typically obtained from a look-up table. In contrast, in order to obtain the number of bits needed to code the predictive residual, $B_{res}$, a three step process 200 is required as depicted in FIG. 2.

Figure 2:
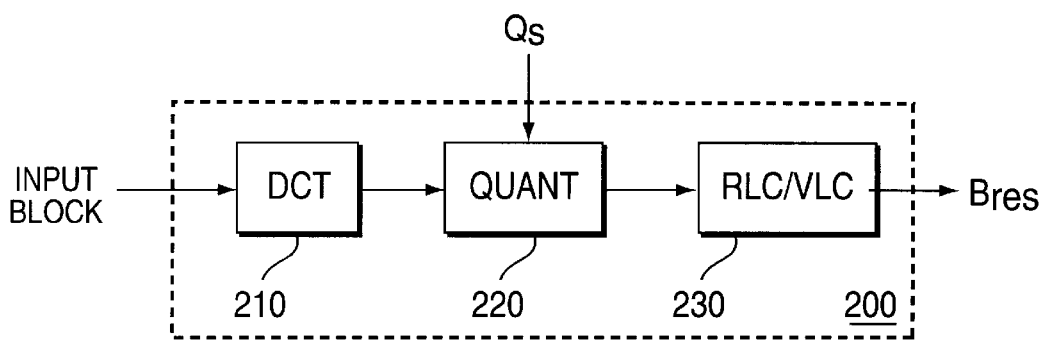
FIG. 2 illustrates a flowchart for deriving the optimal mode decision for a macroblock.

FIG. 2 illustrates process 200 which comprises the steps of DCT transform 210, quantization 220 and run length coding/variable length coding 230. In step 210, DCT is applied to an input block of 8×8 pixels of the predictive residual to produce a block of DCT coefficients. The DCT coefficients are quantized in step 220 to produce an 8×8 block of quantized DCT coefficients. Finally, in step 230, the quantized DCT coefficients are converted into (run, level) pairs. Namely, $B_{res}$ is obtained through a look-up table according to the "run-length" of zeros and the "level" of quantized DCT coefficients. The run-length of zeros represents the number of zeros between successive non-zero quantized DCT coefficients in a zig-zag scanning of the 8×8 block of quantized DCT coefficients, while level represents the amplitude of a quantized DCT coefficient. The use of a look-up table is a conventional practice in run length coding/variable length coding. Thus, $B_{res}$ depends on the pair of values of run and level and is represented by:

$$B_{res} = f(\text{run, level}) \quad (5)$$

In summary, in order to obtain the upper bound on the coding performance, the three step process of FIG. 2 must be performed for each macroblock for all coding modes. Next, the coding mode that uses the least number of bits is selected as the optimal coding mode. The computational overhead of the upper bound method is moderate, but it is a significant improvement over the full-search method.

Figure 3:
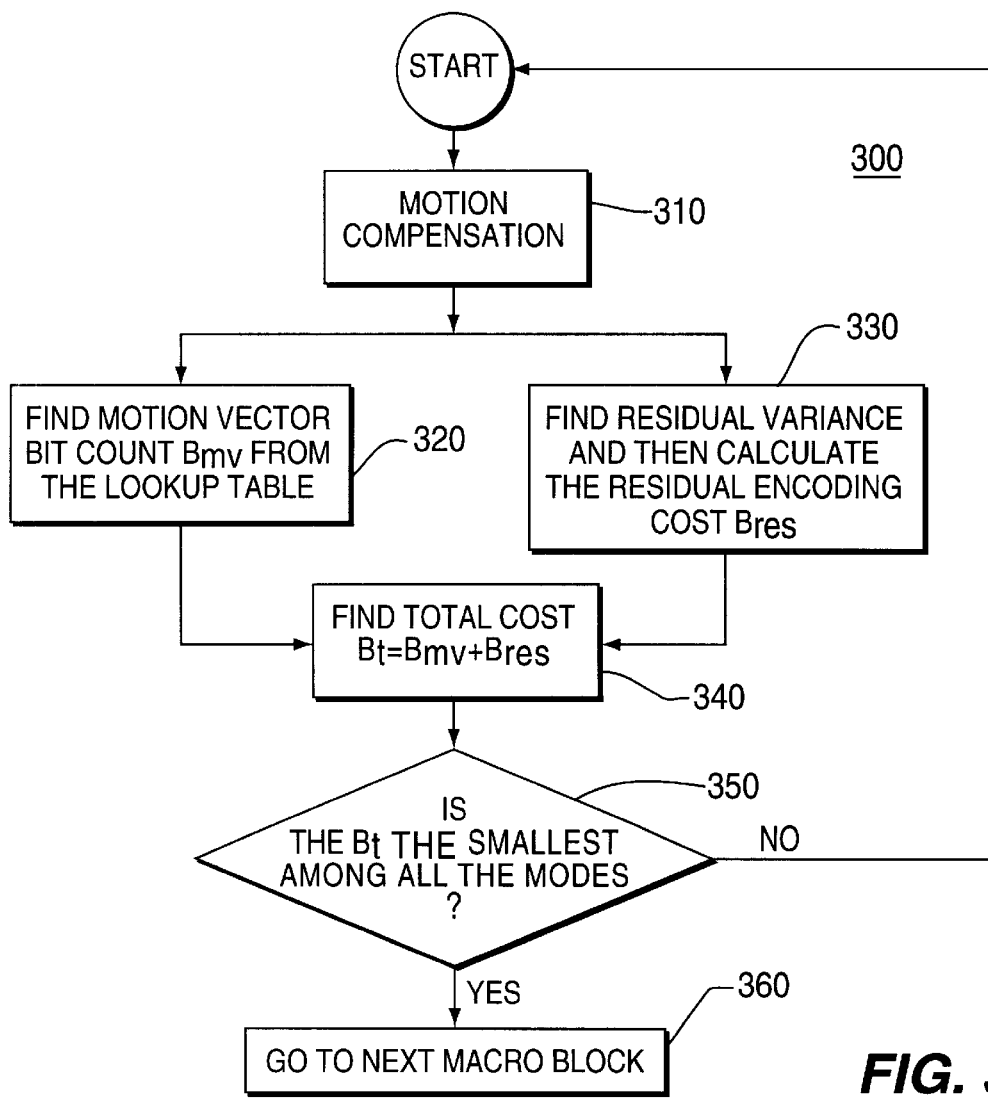
FIG. 3 illustrates a block diagram for coding a predictive residual signal.

FIG. 3 depicts the preferred embodiment of the present invention which further simplifies the more involved coding procedure of the upper bound by providing an approximation of the number of bits, $B_{res}$. The method 300 assumes that the run and level pair in equation (5) is strongly depended on the values of the quantizer scale, q, and the variance of the residual, $V_{res}$, for each macroblock. Thus, the number of bits needed to encode a macroblock should show a directly proportional correlation to the value of its variance and an inversely proportional correlation to the value of the quantizer scale. Therefore, equation (5) is approximated by the expression:

$$B_{res} \approx f(q, V_{res}) = (K/(q+Cq^2))V_{res} \qquad (6)$$

where K and C are constants. Thus, equation (4) is approximated by the expression:

$$B_t = B_{mv} + (K/(q+Cq^2))V_{res} \qquad (7)$$

where the value of $B_t$ is used as the measure for selecting the optimal coding mode for each macroblock. In the preferred embodiment, the values for the constants, K and C, are 1 and 120 respectively. It should be noted that other constant values can be utilized.

Referring to FIG. 3, process 300 performs at step 310, motion compensation on a macroblock to produce a predictive residual and the corresponding motion vectors for a particular coding mode. The motion vectors are passed to step 320 and the predictive residual is passed to step 330.

In step 320, process 300 determines the motion vector bit count $V_{mv}$. In the preferred embodiment, a pre-defined look-up table is provided to ascertain the number of bits needed to code each motion vector.

In step 330, process 300 calculates the number of bits needed to code the predictive residual, $B_{res}$. A calculation of the residual variance is performed which is used in accordance with equation (6) to produce the predictive residual bit count $B_{res}$.

In step 340, process 300 performs a summation of the motion vector bit count $B_{mv}$ and the predictive residual bit count $B_{res}$ to determine the total bit count $B_t$, for the macroblock under the current coding mode. The result is passed to step 350.

In step 350, process 300 determines whether the calculated $B_t$ for the current coding mode is the smallest among all the coding modes. If the decision is affirmatively answered, process 300 selects that coding mode for the macroblock and proceeds to select a coding mode for the next macroblock in step 360. If the decision is negatively answered, process 300 proceeds to step 310 and restarts the calculation for the same macroblock using a different coding mode until a coding mode with the smallest $B_t$ is selected.

The apparatus according to the present invention was tested to perform a number of simulations. In the simulations, three (3) mode decision methods were compared. The first mode decision method (such as TM4 or TM5) is based on selecting a coding mode with the least prediction error energy plus a fixed threshold for motion vector overhead, where the rate control is independently determined (i.e, rate control was not part of the coding mode decision). The second mode decision method (such as the upper bound method) is based on selecting a coding mode with the least number of bits needed to code a macroblock. In this second method, the coding mode selection was optimized based upon the selected quantization scale and a greedy algorithm was applied for differential encoding of motion vectors and DCT coefficients. Finally, the third method is the preferred embodiment of the present invention where the coding mode decision is based on an approximation of the number of bits needed for coding the predictive residual plus the number of bits for motion vectors. The approximation is based on the value of quantization scale and the value of the variance of the residual as expressed in equation (6).

In determining the coding performance of these three methods, a comparison was made of the total number of bits needed for obtaining the same reconstructed quality of a sequence of images. In the simulations, the quantization scale for each macroblock was used as a measure of the reconstructed quality. The TM encoder was first used to code the sequence and the resulting quantizer scale for the corresponding macroblocks were saved. These same quantizer scales were used in the upper bound encoder and the encoder of the present invention. Two sequences, "flower garden" and "bicycle" (each with 150 frames), were used in the computer simulations and the results are displayed in Tables 1 and 2 respectively below.

TABLE 1

(Flower Garden)

|  | Test Model (TM 4 or TM5) (byte) | Near-optimal (Upper Bound) (byte) | Preferred Embodiment of Present (byte) |
| --- | --- | --- | --- |
| Number of bits saving in % versus the TM encoder | 2,545,599 | 2,186,699 14.10% | 2,301,271 9.60% |

TABLE 2

(Bicycle)

|  | Test Model (TM 4 or TM5) (byte) | Near-optimal (Upper Bound) (byte) | Preferred Embodiment of Present (byte) |
| --- | --- | --- | --- |
| Number of bits saving in % versus the TM encoder | 2,514,252 | 1,898,544 24.48% | 2,083,778 17.12% |

The results demonstrate that the joint optimization of mode selection and rate control produces a saving of 14% from the conventional TM method for the flower garden sequence and a 24% saving for the bicycle sequence. Similarly, the preferred embodiment of the present invention obtained over 9% saving for the flower garden sequence and 17% for the bicycle sequence over the TM method. Although the preferred method produced a smaller saving in the total bit count, a saving between 10% to 17% is extremely significant in light of the reduced computational overhead and complexity.

There has thus been shown and described a novel apparatus and method that selects a macroblock coding mode based upon the quantization scale selected for the macroblock. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. An apparatus for encoding an input video image having at least one macroblock, said apparatus comprising:

a motion estimation means responsive to the input video image for generating at least one motion vector;

a motion compensation means, coupled to said motion estimation means, for generating a predicted image signal of the input video image;

a mode decision means, coupled to said motion compensation means, for selecting a coding mode for each macroblock of the input video image from a plurality of available coding modes; and a rate control means, coupled to said mode decision means, for controlling a bit rate of the apparatus, wherein said mode decision means selects said coding mode for a macroblock in accordance with a quantization scale selected by said rate control means.

2. The apparatus of claim 1, further comprising:

a difference means, coupled to said mode decision means, for subtracting said predicted image signal from the input video image to produce a predictive residual signal.

3. The apparatus of claim 2, wherein said mode decision means calculates a total number of bits needed to code said motion vector and said predictive residual signal of a macroblock for each of said plurality of coding modes, where said mode decision means selects a coding mode for said macroblock that codes said macroblock with a least amount of bits.

4. The apparatus of claim 3, wherein said total number of bits is calculated in accordance to the formula:

$$B_t = B_{mv} + (K/(q+Cq^2))V_{res}$$

where $B_t$ is the total number of bits, $B_{mv}$ is the number of bits needed to code said motion vector, q is a quantization scale, $V_{res}$ is a variance of the predictive residual signal and K and C are constants.

5. The apparatus of claim 4, wherein said $B_{mv}$ is obtained from a look-up table.

6. The apparatus of claim 3, wherein said total number of bits is calculated in accordance to the formula:

$$B_t = B_{mv} + B_{res}$$

where $B_t$ is the total number of bits, $B_{mv}$ is the number of bits needed to code said motion vector and $B_{res}$ is the number of bits needed to code said predictive residual signal, wherein said $B_{mv}$ is obtained from a look-up table and said $B_{res}$ is obtained by applying a DCT transform, quantization and run-length coding to said predictive residual signal.

7. The apparatus of claim 2, further comprising:

a transform means, coupled to said mode decision means, for transforming said predictive residual signal into a set of decorrelated coefficients;

a quantization means, coupled to said transform means, for quantizing said set of decorrelated coefficients;

a coding means, coupled to said transform means, for coding said quantized set of decorrelated coefficients and said motion vector;

a buffer means, coupled to said coding means, for storing a data stream for transmission over a channel; and wherein said motion compensation means includes decoding means, for decoding a coded reference image.

8. A method for selecting a coding mode for each macroblock of an input video image signal, comprising the steps of:

(a) generating a motion vector for each macroblock from the input video image signal;

(b) generating a predictive image signal of the input video image signal for each coding mode by using said motion vector;

(c) subtracting said predictive image signal from the input video image signal to produce a predictive residual signal;

(d) controlling a rate of coding of said predictive residual signal; and (e) selecting a coding mode for each macroblock in accordance with a quantization scale selected by said controlling step (d).

9. The method of claim 8, wherein said step (e) includes the steps of:

(e1) calculating a total number of bits needed to code said motion vector and said predictive residual signal of a macroblock for each of said plurality of coding modes; and (e2) selecting a coding mode for said macroblock that codes said macroblock with a least amount of bits.

10. The method of claim 9, wherein said total number of bits in step (e1) is calculated in accordance to the formula:

$$B_t = B_{mv} + (K/(q+Cq^2))V_{res}$$

where $B_t$ is the total number of bits, $B_{mv}$ is the number of bits needed to code said motion vector, q is a quantization scale, $V_{res}$ is a variance of the predictive residual signal and K and C are constants.

11. The method of claim 10, wherein said $B_{mv}$ is obtained from a look-up table.

12. The method of claim 9, wherein said total number of bits in step (e1) is calculated in accordance to the formula:

$$B_t = B_{mv} + B_{res}$$

where $B_t$ is the total number of bits, $B_{mv}$ is the number of bits needed to code said motion vector and $B_{res}$ is the number of bits needed to code said predictive residual signal, wherein said $B_{mv}$ is obtained from a look-up table and said $B_{res}$ is obtained by applying a DCT transform, quantization and run-length coding to said predictive residual signal.

13. The method of claim 8, further comprising the steps:

(f) transforming said predictive residual signal into a set of decorrelated coefficients;

(g) quantizing said set of decorrelated coefficients;

(h) coding said quantized set of decorrelated coefficients and said motion vector;

(I) storing a data stream for transmission over a channel; and (j) decoding a coded reference image signal for further encoding.

* * * * *